(12) United States Patent
Kaplan

(10) Patent No.: US 10,198,056 B2
(45) Date of Patent: *Feb. 5, 2019

(54) FLEXIBLE POWER SUPPORT REDUNDANCY BUSWAY SYSTEM

(71) Applicant: Amazon Technologies, Inc., Seattle, WA (US)

(72) Inventor: Faran Harold Kaplan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/722,863

(22) Filed: Oct. 2, 2017

(65) Prior Publication Data

US 2018/0024608 A1    Jan. 25, 2018

Related U.S. Application Data

(63) Continuation of application No. 14/278,777, filed on May 15, 2014, now Pat. No. 9,778,717.

(51) Int. Cl.
*G06F 1/30* (2006.01)
*H02B 1/22* (2006.01)
*H02J 9/06* (2006.01)

(52) U.S. Cl.
CPC .............. *G06F 1/30* (2013.01); *H02B 1/22* (2013.01); *H02J 9/066* (2013.01);
(Continued)

(58) Field of Classification Search
CPC ...... G06F 1/26; G06F 1/30; H02B 1/20–1/22; H02J 9/04; H02J 9/06; H02J 9/061;
(Continued)

(56) References Cited

U.S. PATENT DOCUMENTS 5,053,637 A * 10/1991 Dillard .................. H02G 3/285
174/486
6,396,169 B1    5/2002 Voegeli et al.
(Continued)

FOREIGN PATENT DOCUMENTS

| CN | 102210081 | 10/2011 |
|---|---|---|
| EP | 1006641 | 7/2000 |
| WO | 2010038152 | 4/2010 |

OTHER PUBLICATIONS

EEP, "Siemens—Busway Purpose and Definition", Edvard, Dec. 23, 2010, pp. 1-6.
(Continued)

*Primary Examiner* — Levi Gannon
(74) *Attorney, Agent, or Firm* — Robert C. Kowert; Meyertons, Hood, Kivlin, Kowert & Goetzel, P.C.

(57) ABSTRACT

A busway system enables multiple interchangeable power support redundancies to be provided to electrical loads. The busway system includes multiple busways extending through an aisle space, where some busways carry power from separate primary power sources, and one or more busways carry power from a secondary power source. Busways are coupled to loads to provide power support directly to the loads, indirectly via devices that distribute power to the loads via branch circuits, etc. The power support redundancy provided to a load is established based at least in part upon which busways are coupled to the load, and power support redundancies can be changed by changing the couplings of particular busways with the loads. The busways can extend through the aisle space in a staggered configuration to enable load balancing between busways by restricting loads in certain regions of the aisle space to coupling with certain busways and not others.

20 Claims, 7 Drawing Sheets

(52) U.S. Cl.
CPC ..... *H02J 2009/068* (2013.01); *Y10T 307/344* (2015.04); *Y10T 307/615* (2015.04)

(58) Field of Classification Search
CPC .. H02J 9/066; H02J 2009/068; H05K 7/1485; H05K 7/1492; Y10T 307/344; Y10T 307/615
See application file for complete search history.

(56) References Cited

U.S. PATENT DOCUMENTS

| | | |
|---|---|---|
| 8,446,039 B2 | 5/2013 | Ziegler |
| 9,164,557 B1 | 10/2015 | Marr et al. |
| 9,778,717 B2 | 10/2017 | Kaplan |
| 2006/0097578 A1 | 5/2006 | Baldwin et al. |
| 2007/0217125 A1 | 9/2007 | Johnson |
| 2009/0073641 A1 | 3/2009 | Ross |
| 2010/0102633 A1 | 4/2010 | Seaton |
| 2011/0187197 A1 | 8/2011 | Moth |
| 2015/0357798 A1* | 12/2015 | Loeffler ............ H02B 1/20 361/624 |

OTHER PUBLICATIONS

VAdata PDX52, "Communications First Floor Overview Plan", Feb. 14, 2014, pp. 1-4.
International Search Report and Written Opinion for PCT/US2015/029569, dated Sep. 2, 2015, Amazon Technologies, Inc., pp. 1-10.
Office Action from Chinese Application No. 201580025476.3, dated Jun. 6, 2018 (Chinese version and English translation), Amazon Technologies, Inc., pp. 1-15.

* cited by examiner

FLEXIBLE POWER SUPPORT REDUNDANCY BUSWAY SYSTEM

This application is a continuation of U.S. patent application Ser. No. 14/278,777, filed May 15, 2014, now U.S. Pat. No. 9,778,717, which is hereby incorporated by reference herein in its entirety.

BACKGROUND

Organizations such as on-line retailers, Internet service providers, search providers, financial institutions, universities, and other computing-intensive organizations often conduct computer operations from large scale computing facilities. Such computing facilities house and accommodate a large amount of server, network, and computer equipment to process, store, and exchange data as needed to carry out an organization's operations. Typically, a computer room of a computing facility includes many computing racks, which may include server racks. Each computing rack, in turn, may include many computer systems, servers, associated computer equipment, etc.

Because the computer room of a computing facility may contain a large number of servers, a large amount of electrical power may be required to operate the facility. In addition, the electrical power is distributed to a large number of locations spread throughout the computer room (e.g., many racks spaced from one another, and many servers in each rack). Usually, a facility receives a power feed at a relatively high voltage. This power feed is stepped down to a lower voltage (e.g., 208V). A network of cabling, bus bars, power connectors, and power distribution units, is used to deliver the power at the lower voltage to numerous specific components in the facility.

The amount of computing capacity needed for any given data center may change rapidly as business needs dictate. Most often, there is a need for increased computing capacity at a location. Initially providing computing capacity in a data center, or expanding the existing capacity of a data center (in the form of additional servers, for example), is resource-intensive and may take many months to implement. Substantial time and resources are typically required to design and build a data center (or expansion thereof), lay cables, install racks, enclosures, and cooling systems to implement waste heat removal therefrom. Additional time and resources are typically needed to conduct inspections and obtain certifications and approvals, such as for electrical and HVAC systems.

Some data centers have no redundancy at the PDU level. Such data centers may have a large affected zone when a UPS or PDU failure in the power system occurs. In addition, some data centers have "single threaded" distribution via the electrical supply to the floor, and in which maintenance can only be performed when the components are shut-off. The down-time associated with maintenance and reconfiguration of primary power systems in a data center may result in a significant loss in computing resources. In some critical systems such as hospital equipment and security systems, down-time may result in significant disruption and, in some cases, adversely affect health and safety.

Some systems include dual power systems that provide redundant power support for computing equipment. In some systems, an automatic transfer switch ("ATS") provides switching from a primary power system to a secondary (e.g., back-up) power system. In a typical system, the automatic transfer switch automatically switches a computing rack to the secondary system upon detecting a fault in the primary power. To maintain the computing equipment in continuous operation, the automatic transfer switch may need to make the transfer to secondary power system rapidly (for example, within about 16 milliseconds).

Some data centers include back-up components and systems to provide back-up power to servers in the event of a failure of components or systems in a primary power system. In some data centers, a primary power system may have its own back-up system that is fully redundant at all levels of the power system. Such a level of redundancy for the systems and components supported by the primary and fully-redundant back-up system may be referred to as "2N" redundancy. For example, in a data center having multiple server rooms, one or more server racks may receive power support from a primary power system and fully-redundant back-up power system. The back-up system for each server room may have a switchboard, uninterruptible power supply (UPS), and floor power distribution unit (PDU) that mirrors a corresponding switchboard, uninterruptible power supply, and floor power distribution unit in the primary power system for that server room. Providing full redundancy of the primary power systems may, however, be very costly both in terms of capital costs (in that in may require a large number of expensive switchboard, UPSs, and PDUs, for example) and in terms of costs of operation and maintenance. In addition, with respect to the primary computer systems, special procedures may be required to switch components from the primary system to a back-up system to ensure uninterrupted power supply for the servers, further increasing maintenance costs. As a result, some data centers may include a back-up system that is less than fully redundant for a primary power system. Such a level of redundancy for the systems and components supported by the primary and fully-redundant back-up system may be referred to as "N+1" redundancy. While N+1 redundancy may not provide fully-redundant reserve power support for computing equipment, such redundancy may involve lower capital and operating costs.

Some systems include one or more power systems that provide power concurrently to a set of computing equipment independently of a switching between the power servers upstream of the set of computing equipment. Such systems may provide 1N redundancy, 2N redundancy, etc. for the computing units.

In some data centers, some sets of computing equipment may be configured for power support of various types of redundancy. For example, some server racks having servers configured for critical tasks may receive 2N reserve power support, some server racks may receive N+1 reserve power support, and some server racks may receive a concurrent supply of power from one or more separate power feeds independently of an upstream transfer switch. Configuring each rack for a particular type of power redundancy with support from particular power systems may be costly and time-consuming, as each configuration may require specific configurations of specific upstream systems and components to establish a given power support redundancy for a given server rack.

As a result, providing various power support redundancies, from various power sources, to various sets of computing equipment in a data center may require excessive expenditures of time, resources, and data center floor space, wall space, etc. to provide specific systems and components for each particular power support redundancy type from each particular power system used to provide such redundancies. In addition, due to the specific systems and components, and configurations thereof, required to provide a given redundancy, changing a power support redundancy for a particular set of computing equipment may be time consuming and expensive, as such changes may require re-arrangement, addition, removal, etc. of various systems and component configurations specific to providing such redundancies. Such changes may further require extended computing unit downtime to implement changes in specific systems and components, as such reconfigurations of various systems and components in a data center may require temporarily taking otherwise unrelated systems and components offline, thereby exacerbating costs.

Figure 1:
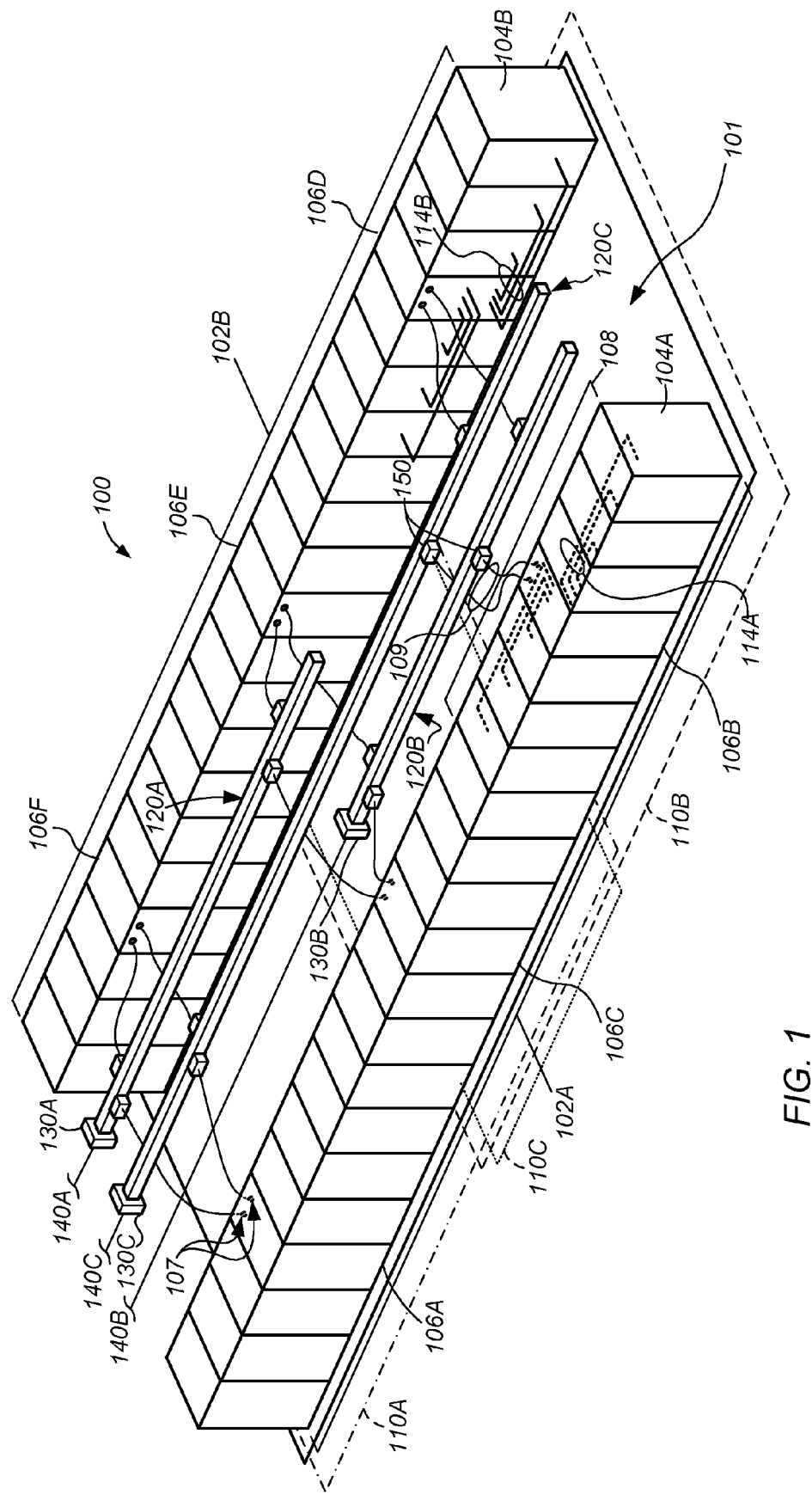
FIG. 1 is a schematic illustrating a perspective view of a computing room in which various busways in a busway system provide various power support redundancies to various rack computer systems via power routing assemblies according to some embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of busway systems for providing configurable power support redundancies to computer systems in a data center are disclosed. According to one embodiment, a data center includes an aisle space, a row of rack computer systems extending through the aisle space, and elevated primary power busways and a secondary power busway extending through the aisle space. The primary power busways extend through the aisle space, in parallel with the row of rack computer systems, in a staggered configuration, where each primary power busway extends less than the full length of the aisle space and extends through at least one region of the aisle through which at least one other primary power bus does not extend. The secondary power busway extends through the entire aisle space. The busways can electrically couple, via separate power cables coupled to some of the separate busways, to a rack computer system to provide a particular power support redundancy to that rack computer system. The cables can be decoupled from busways and recoupled to other busways, or a rack can be decoupled from cables extending from some busways and recoupled to cables extending from other busways, to change the power support redundancy provided to the rack computer system. Where the rack computer system receives power from a switching device assembly, the busways can couple to the switching device assembly, and power can be distributed from the switching device assembly to the rack computer system via branch circuits. The branch circuits can be maintained even if the power support redundancy provided to the switching device assembly is changed.

According to one embodiment, a system includes power busways that extend through an aisle space, where the busways can interchangeably provide one of multiple various power support redundancies to one or more electrical loads in the aisle space, depending upon which selection of busways are coupled to the electrical load via separate power cables. The busways can include at least two primary power busways that distribute power from separate primary power sources and a secondary power busway that distributes power from a secondary power source.

According to one embodiment, a method includes configuring an aisle space to interchangeably provide various power support redundancies to various electrical loads located in the aisle space. The various power support redundancies are provided via various power busways, and the configuring includes installing the busways in the aisle space and electrically coupling one or more of the busways to the electrical loads via one or more power cables, where which power support redundancy is provided depends upon which busways are coupled to the load. The busways include two or more primary power busways that are each installed to extend through a portion of the aisle space and a secondary power busway that extends through the entire aisle space. The primary power busways each distribute power from a separate primary power source, and the secondary power busway distributes power from a secondary power source.

As used herein, "computer room" means a room of a building in which computer systems, such as rack-mounted servers, are operated.

As used herein, "data center" includes any facility or portion of a facility in which computer operations are carried out. A data center may include servers dedicated to specific functions or serving multiple functions. Examples of computer operations include information processing, communications, simulations, and operational control.

As used herein, "operating power" means power that can be used by one or more computer system components. Operating power may be stepped down in a power distribution unit or in elements downstream from the power distribution units. For example, a server power supply may step down operating power voltages (and rectify alternating current to direct current).

As used herein, providing power "support" refers to providing one or more power feeds to be available to one or more downstream systems and components, including one or more electrical loads. Such provided power feeds may be precluded from being received by the systems and components but may be made available for receipt based at least in part upon a positioning of one or more components upstream of the systems and components. For example, a reserve power system may provide reserve power support to an electrical load by providing a reserve power feed that can be selectively routed to the load by a transfer switch that is downstream of the reserve power system and upstream of the load, where the transfer switch may selectively route the reserve power feed or a primary power feed to the load based at least in part upon one or more conditions associated with the primary power feed.

As used herein, "power distribution unit", also referred to herein as a "PDU", means any device, module, component, or combination thereof, which can be used to distribute electrical power. The elements of a power distribution unit may be embodied within a single component or assembly (such as a transformer and a rack power distribution unit housed in a common enclosure), or may be distributed among two or more components or assemblies (such as a transformer and a rack power distribution unit each housed in separate enclosure, and associated cables, etc.).

As used herein, "primary power" means any power that can be supplied to an electrical load, for example, during normal operating conditions. A power distribution system (also referred to herein as a "power system") that distributes primary power may be referred to as a primary power system.

As used herein, "floor power distribution unit" refers to a power distribution unit that can distribute electrical power to various components in a computer room. In certain embodiments, a power distribution unit includes a k-rated transformer. A power distribution unit may be housed in an enclosure, such as a cabinet.

As used herein, "rack power distribution unit" refers to a power distribution unit that can be used to distribute electrical power to various components in a rack. A rack power distribution may include various components and elements, including wiring, bus bars, connectors, and circuit breakers.

As used herein, "reserve power" means power that can be supplied to an electrical load upon the failure of, or as a substitute for, primary power to the load. A power distribution system (also referred to herein as a "power system") that distributes reserve power may be referred to as a reserve power system.

As used herein, "computer system" includes any of various computer systems or components thereof. One example of a computer system is a rack-mounted server. As used herein, the term computer is not limited to just those integrated circuits referred to in the art as a computer, but broadly refers to a processor, a server, a microcontroller, a microcomputer, a programmable logic controller (PLC), an application specific integrated circuit, and other programmable circuits, and these terms are used interchangeably herein. In the various embodiments, memory may include, but is not limited to, a computer-readable medium, such as a random access memory (RAM). Alternatively, a compact disc-read only memory (CD-ROM), a magneto-optical disk (MOD), and/or a digital versatile disc (DVD) may also be used. Also, additional input channels may include computer peripherals associated with an operator interface such as a mouse and a keyboard. Alternatively, other computer peripherals may also be used that may include, for example, a scanner. Furthermore, in the some embodiments, additional output channels may include an operator interface monitor and/or a printer.

In various embodiments, a busway system can be installed in a computer room, where the busway system enables multiple various power support redundancies to be provided to various rack computer systems in the computer room and the power support redundancies can be changed for various rack computer systems without requiring the busways and other rack computer systems to be de-energized. In addition, some embodiments of the busway system can enable load balancing of busway systems in the computer room by physically restricting which rack computer systems with which certain busways can couple.

FIG. 1 is a schematic illustrating a perspective view of a computing room in which various busways in a busway system provide various power support redundancies to various rack computer systems via power routing assemblies according to some embodiments.

Computer room 100 includes aisle space 101 through which two rows 102A-B of rack computer systems extends and through which a system of busways 120A-C extend. Each row 102A-B includes various rack computer systems 104A-B. The rack computer systems 104 may each have different electrical load requirements. In some embodiments, rack computer systems 104 receive power from upstream components that distribute power from one or more power busways to various rack computer systems. Such upstream components can include power distribution units, including floor power distribution units, switching device assemblies, which can include a cabinet in which one or more automatic transfer switches (ATSs) are installed, which can distribute power from one or more busways to various rack computer systems.

In the illustrated embodiment, each row 102A-B includes various sets 108 of rack computer systems, where each set 108 includes a selection of rack computer systems 104 which each receive power from one of various ATS cabinets 106A-F in the rows 102 via branch circuits 114, where each ATS cabinet 106 is coupled, at power inlets 107, to one or more busways 120 via power cables 109 and tap boxes 150.

The tap boxes 150 can include one or more of receptacle tap boxes which couple to a busway and include receptacles to which a power cable 109 can couple to electrically couple an ATS cabinet 106 to a busway 120. In some embodiments, tap boxes 150 include one or more disconnect boxes which can include circuit breakers and can couple a busway directly to a rack computer system via a power cable 109.

Busways 120A-C extend through the aisle space 101 and provide various power support redundancies to rack computer systems 104 in the room 100. Busways 120 include primary power busways 120A, B and secondary power busway 120C. Each of the primary power busways 120A, B, in some embodiments, receive and carry power from separate primary power sources, and secondary power busway 120C can receive and carry power from a secondary power source. In some embodiments, a secondary power source includes a reserve power source. Each busway may receive a respective power feed, at a respective input 130A-C from a respective power source, via respective power transmission lines 140A-C, which can enter room 100 from an external location.

In some embodiments, one or more rack computer systems 104A-B, ATS cabinets 106A-B, etc. can couple with one or more busways 120 extending through the aisle space to receive power support from one or more power sources. The configuration of power support can be referred to as a power support redundancy. In some embodiments, a rack computer system is electrically coupled, via cables 109, boxes 150, etc., to a single busway 120, busways 120 carrying power from a single power source, etc. Such a rack computer system may be referred to as having an "N" power support redundancy. In some embodiments, a rack computer system is electrically coupled to separate primary power busways carrying power from a separate primary power sources, etc. Such a rack computer system may be referred to as having a "2N" power support redundancy. In the illustrated embodiment, ATS cabinets 106B, D are coupled, via separate cables 109 and boxes 150, to separate primary power busways 120A, B, so that ATS cabinets 106B, D can selectively route power from one of two primary power sources to rack computer systems 104A,B to which the ATS cabinets 106B, D are each coupled via branch circuits 114A, B.

In some embodiments, the various busways 120A-C in a busway system extending through an aisle space 101 can be configured to extend through various regions of the aisle space. In some embodiments, including the illustrated embodiment, a "region" of an aisle space includes a limited portion of the length of the aisle space that spans some or all of the full width of the aisle space and encompasses at least one electrical load extending along the length of the aisle space. For example, in the illustrated embodiment, aisle space 101 includes regions 110A-C. Some of the busways can extend through the aisle space 101 in a "staggered" configuration, where some busways extend through some regions of the aisle space and not others. Such busways can extend through less than a full length of the aisle space, and a busway extending as part of a staggered configuration can extend through at least one region of the aisle space through which another busway does not extend.

In some embodiments, extending busways in a staggered configuration can provide a physical restriction regarding which particular power support redundancies can be provided to various rack computer systems in a computer room. Such a restriction can enable load balancing across various busways by restricting rack computer systems in certain regions of the room to receive power from certain busways that extend through that region and not from busways that do not extend through that region.

In the illustrated embodiment, for example, busways 120A, B extend in a staggered configuration through aisle space 101, where busway 120A extends through region 110A but busway 120B does not, while busway 120B extends through region 120B but busway 120A does not. As a result, and as shown in the illustrated embodiment, ATS cabinets 106A and 106F located in region 110A couple to busways 120A,C that extend through region 110A to receive power support redundancy from the particular primary power source 140A feeding power to busway 110A and the secondary power source 140C through busway 120C. In contrast, cabinets 106B and 106D, located in region 110B, couple to busways 120B, C that extend through region 110B to receive power support redundancy from the other particular primary power source 140B feeding power to busway 110B and the secondary power source 140C through busway 120C. As a result, the primary power electrical load in rows 102A-B can be balanced between busways 120A, B based on the region in which the loads, or upstream components distributing power to the loads, are located. In some embodiments the secondary power busway 120C extends through the entirety of aisle space 101 and can provide secondary power support to rack computer systems regardless of location in the aisle space 101.

In some embodiments, the load balancing between staggered busways is enforced via the power cables 109 which electrically couple the busways to the loads. The cables can be sized to preclude the loads from being coupled to a busway that does not extend through the region of the aisle space in which the load is located, thereby forcing the load to be coupled to a busway extending through the same region. Such a restriction, or "interlock", can preclude one or more of the primary power busways from supporting a disproportionate amount of the load in an aisle space, and can mitigate the number of loads in a computer room that are affected by a failure of a given primary power source, busway, ATS cabinet, etc.

In some embodiments, an aisle space 101 includes a "common region" 110C in which multiple busways 120A, B that extend in a staggered configuration also extend. Such a region, where the staggered busways "overlap" in extending through the same region, can be a region in which rack computer systems, ATS cabinets, etc. can be coupled with multiple staggered busways. For example, in the illustrated embodiment, where busways 120A, B are staggered and both extend through a common region 110C, ATS cabinets 106C, E located in the common region 110C can couple with both of the staggered busways 120A, B in the common region 110C and can selectively route power from one of the busways to rack computer systems 104A-B via branch circuits. As busways 120A, B are both carrying primary power, rack computer systems in the common region 110C, including rack computer systems 104 linked with one or more of ATS cabinet 106C or 106E in the common region 110C, can receive a 2N power support redundancy.

Figure 2:
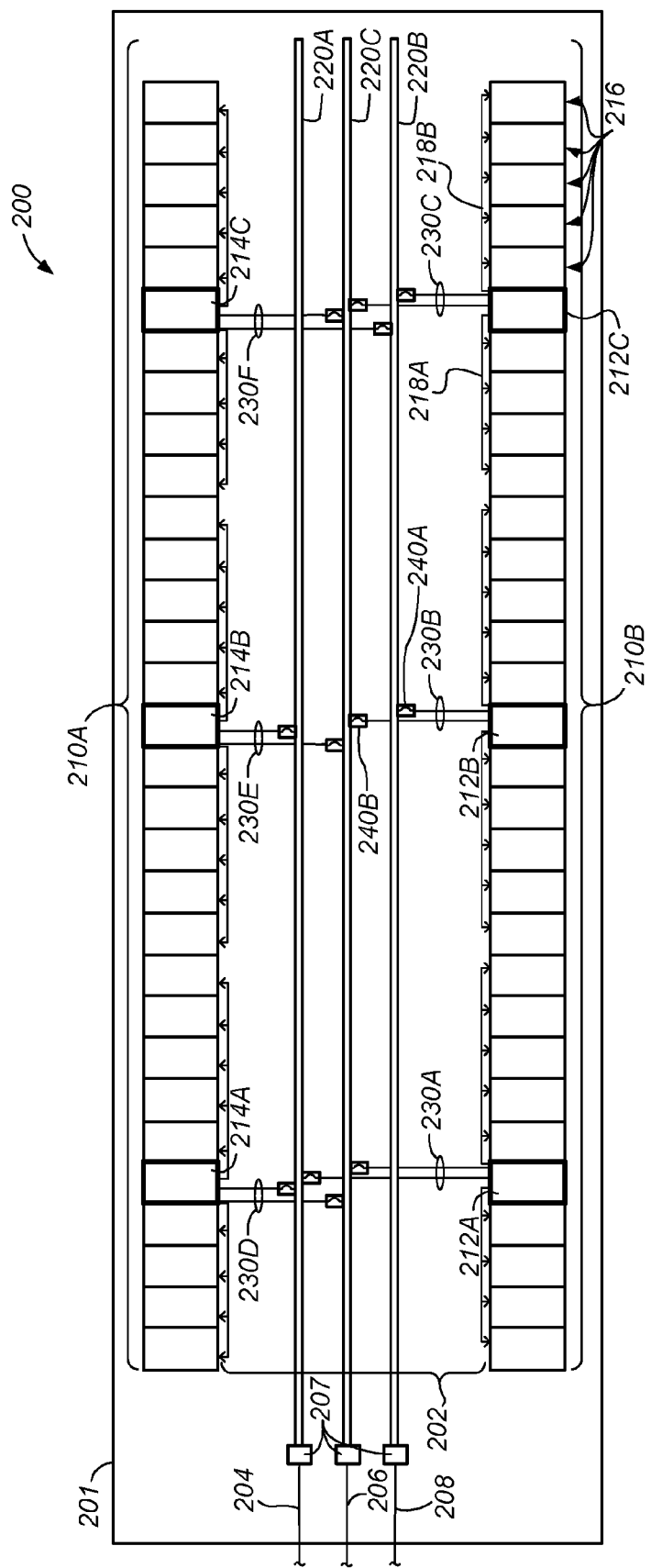
FIG. 2 is a schematic diagram illustrating a data center computing room having a full-length busway system providing power support redundancies to various rack computer systems according to some embodiments.

FIG. 2 is a schematic diagram illustrating a data center computing room having a full-length busway system providing power support redundancies to various rack computer systems according to some embodiments. Data center 200 includes a computer room 201 with aisle space 202, busways 220A-C extending through a full length of the aisle space 202, and two rows 210A-B of electrical loads extending in parallel with the busways through the length of the aisle space 202. Each busway 220A-C receives power from a respective power source via respective power transmission lines 204, 206, 208 feeding into respective busway inputs 207A-C.

In some embodiments, a busway system includes multiple busways that extend through a full length of an aisle space of a computer room, where an electrical load located in the aisle space electrically couples with one or more of the busways to receive one of multiple various power support redundancies. For example, in the illustrated embodiments, electrical loads 212A, 214A, 214B are electrically coupled, via respective sets of power cables 230A, 230D, 230E to busways 220A and 220C despite being located in various regions of the aisle space 202, and electrical loads 212B, 212C, 214F are electrically coupled, via respective sets of power cables 230B, 230C, 230F to busways 220B and 220C despite being located in various regions of the aisle space 202. The electrical loads 212, 214 can include rack computer systems 216 in which various computer systems are mounted in one or more racks, upstream components including ATS cabinets 212, 214 which distribute power from one or more busways to various rack computer systems 216 via branch circuits 218A-B, etc.

The sets of power cables 230A-E can be coupled with one or more busways 220A-C via coupling with a tap box that is coupled with the respective busway. Such tap boxes can include receptacle tap boxes, disconnect boxes, etc. In the illustrated embodiment, for example, load 212B can be a rack computer system coupled to busways 220B, 220C via separate power cables 230B and respective disconnect boxes 240A, B to receive N+1 power support redundancy from the busways 220B, 220C.

In some embodiments, the various loads in a computer room can be changed from one power support redundancy to another power support redundancy by changing which busways are electrically coupled to the loads. Where the loads include upstream components in the computer room, including an ATS cabinet that distributes power to rack computer systems via branch circuits, changing the power support redundancy can include changing which power cables, from various busways, are coupled to power inlets of the component, or changing which busways are coupled to cables feeding into one or more of the component inlets, while maintaining the branch circuits from the component, maintaining distribution of power through the various busways, etc. As a result, power support redundancies can be interchangeably provided and changed as needed without requiring extensive de-energization and maintenance of equipment in the aisle space 202. For example, where busways 220A, B carry power from separate primary power sources and busway 220C carries power from a secondary power source, load 212B can be changed from receiving an N+1 power support redundancy, via busways 220B, 220C to a 2N power support redundancy through decoupling box 240A from busway 220C and recoupling the box 240A, and its attendant cable 230B, to busway 220A, thereby enabling load 212B to be electrically coupled to both primary power busways 220A, 220B.

Figure 3:
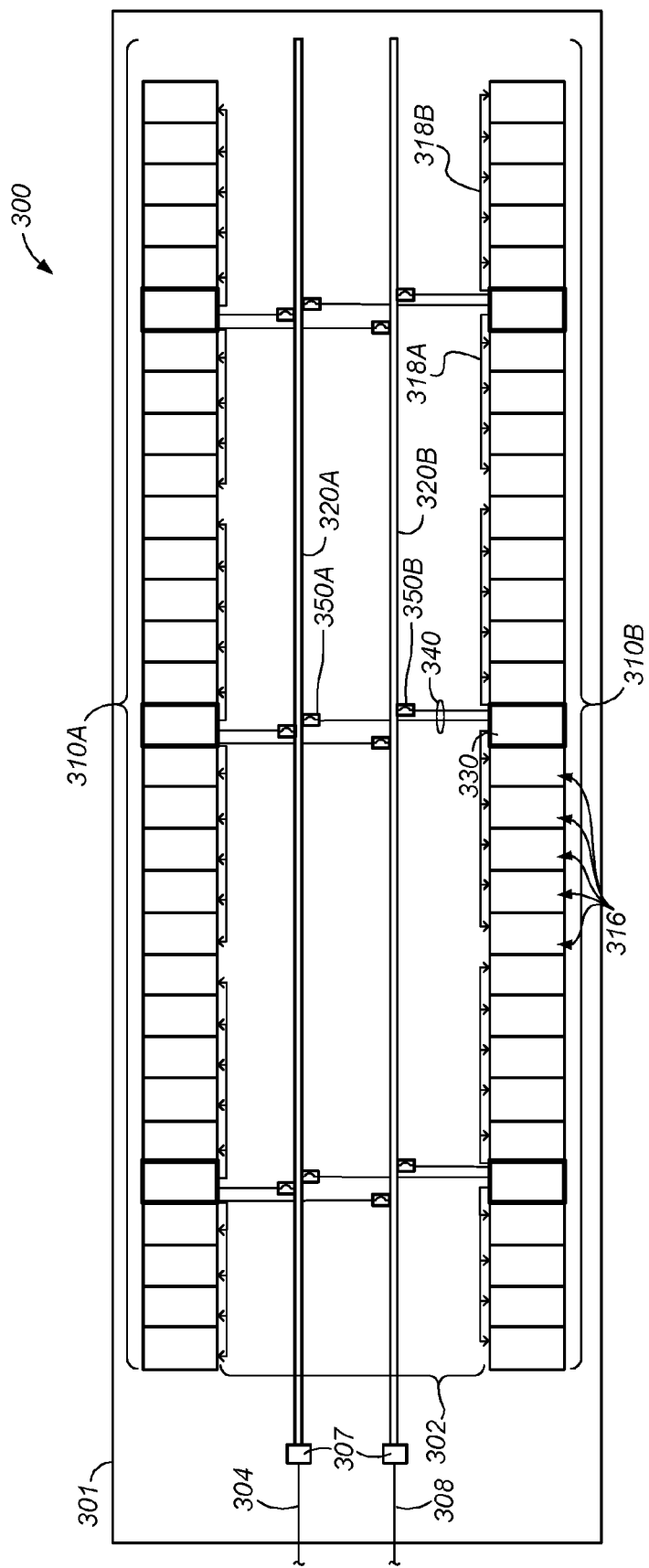
FIG. 3 is a schematic diagram illustrating a data center computing room having a full-length busway system providing primary power support redundancies to various rack computer systems according to some embodiments.

FIG. 3 is a schematic diagram illustrating a data center computing room having a full-length busway system providing primary power support redundancies to various rack computer systems according to some embodiments.

In some embodiments, a busway system includes exclusively primary power busways extending through a computer room aisle space, thereby restricting the power support redundancies available to electrical loads in the aisle space while enabling rapid installation and changing of the available power support redundancies. Such available redundancies can include N, 2N, 3N, etc. redundancies. In the illustrated embodiment, for example, data center 300 includes a computer room 301 with an aisle space 302 through which primary power busways 320A-B extend and rows 310A-B of electrical loads 316, 330 extend in parallel with the busways. Each busway received power from a respective power source via respective power transmission lines 304, 308 feeding into respective busway inputs 307. The electrical loads can include rack computer systems 316, upstream components 330 distributing power to rack computer systems 316 via branch circuits 318A-B, etc.

Various electrical loads 316, 330 are installed in the aisle space 302, where the loads 330 are electrically coupled to each of busways 320A-B via separate power cables 340 and boxes 350A-B. In some embodiments, the boxes 350A-B are each disconnect boxes that can provide breaker support for power supplied from a respective busway to which the box is coupled to the electrical load 330, which can be a rack computer system. The boxes 350A-B can be decoupled and re-coupled to various busways, enabling the load 330 to receive various power support redundancies via the power cables 340. For example, box 350A can be decoupled from busway 320A and recoupled to busway 320B to change load 330 from a 2N power support redundancy to an N power support redundancy. In another example, box 350A can be decoupled from load 330, and another box that is coupled to busway 320B can be coupled to load 330 to change the load from 2N to N power support redundancy.

Installing or removing an electrical load from an aisle space through which the busway system extends, in some embodiments, can simply include coupling or decoupling the load with one or more busways via one or more power cables. The power cables can remain fixed to respective busways and can be coupled to proximate loads in the aisle space. In some embodiments, the power cables remain fixed to respective power inlets of one or more loads and can be removably coupled to various busways via respective boxes 350.

Figure 4:
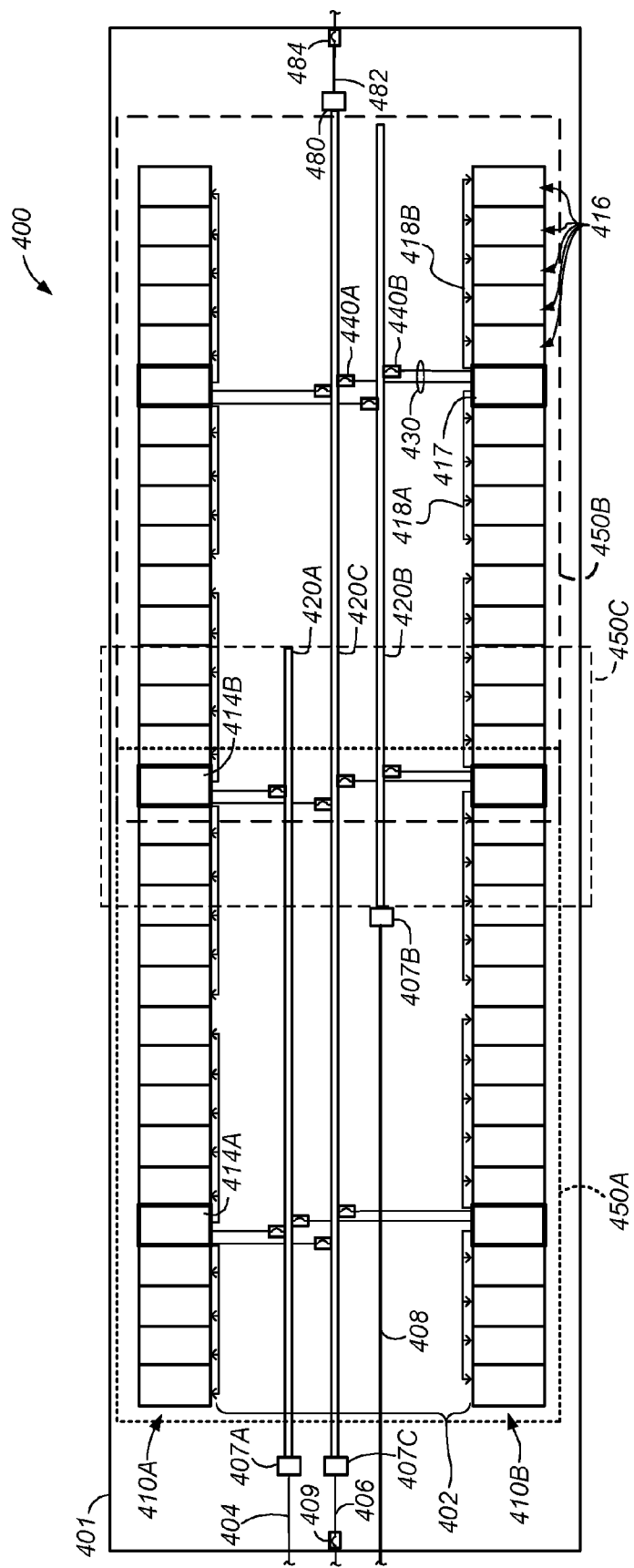
FIG. 4 is a schematic diagram illustrating a data center computing room having a staggered busway system providing concurrently maintainable secondary power support redundancy to various rack computer systems according to some embodiments.

FIG. 4 is a schematic diagram illustrating a data center computing room having a staggered busway system providing concurrently maintainable secondary power support redundancy to various rack computer systems according to some embodiments.

Computer room 401 includes aisle space 402 through which two rows 410A-B of rack computer systems extends and through which a system of busways 420A-C extend. Each row 410A-B includes various electrical loads 416-417. In some embodiments, some electrical loads 417 are directly coupled to one or more busways 420 via one or more tap boxes 440 and power cables 430 and some electrical loads 416 are indirectly coupled to the busways 420 via branch circuits 418A-B distributing power to the loads 416 from the loads 417 that are directly coupled to the busways 420. Branch circuits can be coupled to one or more of an aisle-facing side of one or more of the electrical loads 416, 417. In the illustrated embodiments, the branch circuits 418 are coupled to aisle-facing sides of both electrical loads 416, 417. It will be understood that, in some embodiments, one or more of the branch circuits may be coupled to aisle-distal sides, which face away from aisle 402, of one or more of the loads 416, 417. The electrical loads, which can include rack computer systems, may each have different electrical load requirements. In some embodiments, loads 416 are rack computer systems that receive power from loads 417 that are upstream components that distribute power from one or more power busways 420. Such upstream components can include power distribution units, including floor power distribution units, switching device assemblies, which can include a cabinet in which one or more automatic transfer switches (ATSs) are installed, which can distribute power from one or more busways to various rack computer systems.

Busways 420A-C extend through the aisle space 402 and provide various power support redundancies to one or more of electrical loads 414, 417, 416. Busways 420A-C include primary power busways 420A, B and secondary power busway 420C. Each of the primary power busways 420A, B, in some embodiments, receive and carry power from separate primary power sources at respective power inlets 407A, B via power transmission lines 404, 408, and secondary power busway 420C can receive and carry power from a secondary power source at one or more of inlets 407, 480 via one or more of power transmission lines 406, 482. In some embodiments, a secondary power source includes a reserve power source.

In some embodiments, the various busways 420A-C in a busway system extending through an aisle space 202 can be configured to extend through various regions of the aisle space 202. Some of the busways 420A-C can extend through the aisle space 202 in a "staggered" configuration, where some busways extend through some regions of the aisle space and not others. Such busways can extend through less than a full length of the aisle space, and a busway extending as part of a staggered configuration can extend through at least one region of the aisle space through which another busway does not extend. In some embodiments, extending busways in a staggered configuration can provide a physical restriction regarding which particular power support redundancies can be provided to various rack computer systems in a computer room. Such a restriction can enable load balancing across various busways by restricting rack computer systems in certain regions of the room to receive power from certain busways that extend through that region and not from busways that do not extend through that region.

In the illustrated embodiment, for example, busways 420A, B extend in a staggered configuration through aisle space 402, where busway 420A extends through region 450A but busway 420B does not, while busway 420B extends through region 450B but busway 420A does not. As a result, and as shown in the illustrated embodiment, electrical loads 417 located in region 450A couple to busways 420A, C that extend through region 450A to receive power support redundancy from the particular primary power source feeding power to busway 420A via power transmission line 404 and the secondary power source feeding power to busway 420C via one or more of power transmission lines 406, 482. In contrast, electrical loads 417 located in region 450B couple to busways 420B, C that extend through region 450B to receive power support redundancy from the other particular primary power source feeding power to busway 420B via power transmission line 408 and the secondary power source feeding power to busway 420C via one or more of power transmission lines 406, 482. As a result, the primary power electrical load in rows 410A-B can be balanced between busways 420A, B based on the region 450A-B in which the loads, or upstream components distributing power to the loads, are located. In some embodiments the secondary power busway 420C extends through the entirety of aisle space 402 and can provide secondary power support to rack computer systems regardless of location in the aisle space 402.

In some embodiments, the load balancing between staggered busways is enforced via the power cables 430 which electrically couple the busways 420 to the loads 416-417. The cables 430 can be sized to have a length that precludes the loads 416-417 from being coupled to a busway 420 that does not extend through the region 450 of the aisle space 402 in which the load 416-417 is located, thereby forcing the load to be coupled to a busway 420 extending through the same region 450. Such a restriction, or "interlock", can preclude one or more of the primary power busways 420A-B from supporting a disproportionate amount of the load 416-417 in the aisle space 402 and can mitigate the number of loads 416-417 in a computer room 401 that are affected by a failure of a given primary power source, busway, ATS cabinet, etc.

In some embodiments, aisle space 402 includes a "common region" 450C in which multiple busways 420A, B that extend in a staggered configuration also extend. Such a region, where the staggered busways "overlap" in extending through the same region, can be a region in which loads 416-417, which can include one or more rack computer systems, ATS cabinets, etc. can be coupled with multiple staggered busways 420. For example, in the illustrated embodiment, where busways 420A, B are staggered and both extend through a common region 450C, one or more of electrical loads 417 located in the common region 450C can couple with both of the staggered busways 420A, B in the common region 450C and can selectively route power from one of the busways 420A-B to electrical loads 416 via branch circuits 418A-B. As busways 420A, B are both carrying primary power, electrical loads installed in the common region 450C, electrically coupled to one or more electrical loads installed in the common region 450C, etc., can receive a 2N power support redundancy.

In some embodiments, one or more busways in a busway system include a busway that is concurrently connected, via multiple power inlets, to one or more separate power sources. The busway can carry power from one or more of the power sources. As a result, the busway can maintain power support to various electrical loads, even in the event of power loss from one or more power sources, power transmission lines, etc.

The illustrated data center 400 includes a computer room 401 in which rows 410A-B of rack computer systems extend along opposite sides of an aisle space 402. A busway system of busways 420A-C extends through the aisle space 402 and includes primary power busways 420A, 420B and a secondary power busway 420C. Secondary power busway 420C includes multiple separate power inlets 407C, 480 that are fed power from separate power transmission lines 406, 482. Power transmission lines 406, 482, in some embodiments, feed power from a common power source to secondary power busway 420C. The separate power transmission lines can provide redundant power transmission pathways from the power source to the busway.

In some embodiments, power transmission lines 406, 482 feed power to busway 420C from separate power sources. Power transmission lines 406, 482 can each include separate breakers 409, 484. The separate breakers can switch between alternated open and closed positions, so that only one power source is feeding power to busway 420C at a time. If the power from one power source presently feeding power to busway 420C becomes unavailable, due to instability, outright power loss, etc., the breaker providing breaker support for that power source may open to isolate the busway 420C from the unavailable power support, while the other breaker for the other power source may close to enable that other power source to distribute power to the busway 420C.

In some embodiments, the separate power sources concurrently feed power to busway 420C via the separate power transmission lines 404, 484. As a result, busway 420C can provide continuous power support, even in the event of a loss of one of the power sources. In the illustrated embodiment, busway 420 may be a secondary power busway, where busways 420A and 420B are primary power busways. As a result, while secondary power busway 420C may be an intermittent source of operating power to electrical loads, the separate power transmission lines and inlets can enable busway 420C to provide concurrently maintainable secondary power support.

Figure 5:
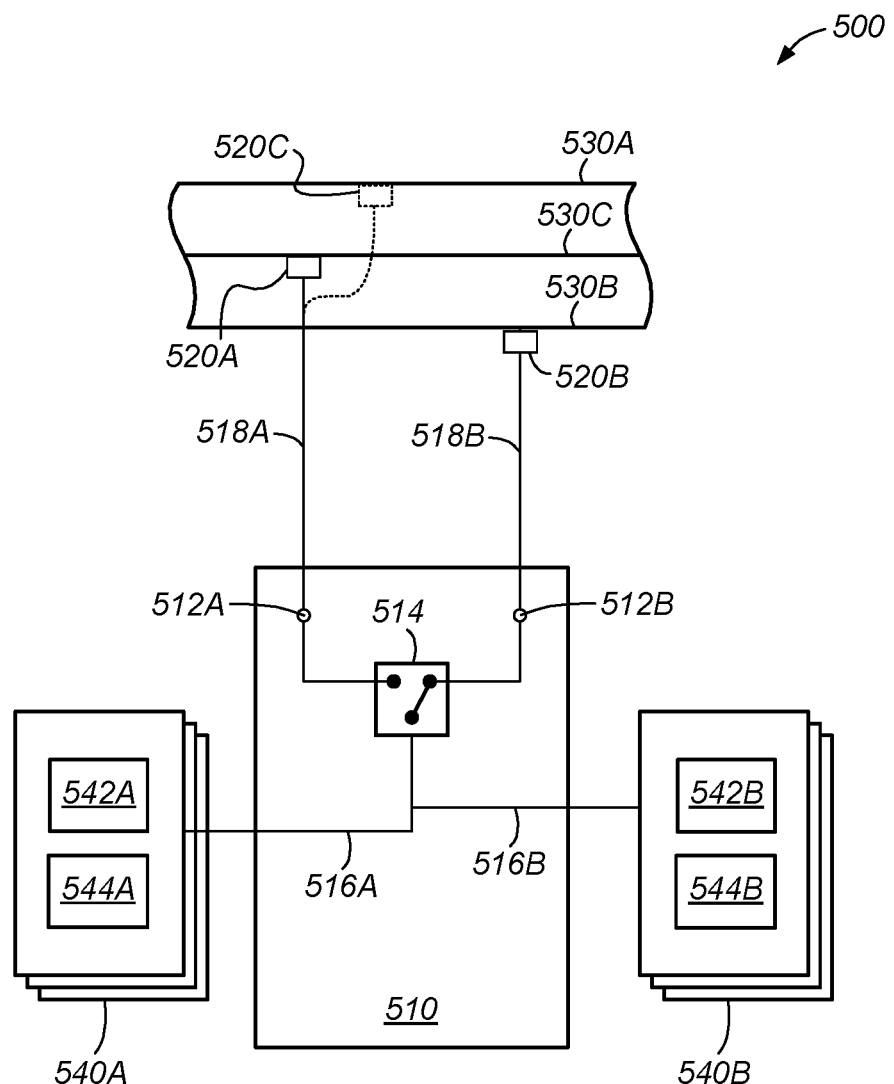
FIG. 5 is a schematic diagram illustrating a power routing assembly routing power from various busways to various rack computer systems according to some embodiments.

FIG. 5 is a schematic diagram illustrating a power routing assembly routing power from various busways to various rack computer systems according to some embodiments. Computer room 500 includes a busway system of power busways 530A-C, a power routing assembly 510, and racks 540A-B.

Busways 530A-C each carry power from one or more power sources, and each busway, in some embodiments, carries power from one or more separate power sources. Power carried on a given busway can be distributed to various electrical loads based at least in part upon electrically coupling the busway with the load. Such electrical coupling can include directly coupling a power inlet of the load with the busway, indirectly coupling the load with the busway via an upstream component, etc. In the illustrated embodiment, a power routing assembly is directly coupled to busways 530C and 530B via separate power cables 518A, 518B and tap boxes 520A, 520B, where the tap boxes are coupled with the respective busways and the cables carry power from the busways to respective power inlets 512A, 512B of the power routing assembly 510 via the separate tap boxes.

Power routing assembly 510 includes at least one power routing module 514 which can distribute power from one or more of the coupled busways to one or more downstream electrical loads, including the illustrated racks 540A-B. In some embodiments, routing module 514 includes an electrical bridge element that enables power from multiple coupled busways, including the illustrated coupled busways 530B-C, to be concurrently distributed to one or more downstream loads. In some embodiments, including the illustrated embodiment, routing module 514 includes a switching device assembly, including an ATS, which can selectively distribute power from one of the coupled busways to one or more downstream loads.

Racks 540A-B include rack computer systems 542A-B and rack-level power distribution units 544A-B. Power distributed from routing module 514 of the power routing assembly 510 can be distributed to various racks 540A-B, and the various components included therein, via one or more various branch circuits 516A-B. In the illustrated embodiment, the racks are presented in separate sets of racks, which can include separate sets of racks mounted proximate to opposite sides of the power routing assembly 510 in a room. Branch circuits 516A, 516B coupling the power routing assembly 510 to each respective set of racks 540A, 540B can include one or more sets of branch circuits that electrically couple the power routing assembly 510 to at least one of the rack computer systems 542A-B in one or more sets of racks 540A-B, thereby enabling the power routing assembly 510 to distribute power to the rack computer system via at least one branch circuit.

In some embodiments, one or more various power support redundancies can be provided to various electrical loads in a computer room based at least in part upon the particular coupling of one or more busways in a busway system with one or more various upstream components that distribute power to the electrical loads. For example, in the illustrated embodiment, where busways 530A, 530B carry power from separate primary power sources, and busway 530C carries power from a secondary power source, the busways 530C, B can provide an N+1 power support redundancy to the rack computer systems 542A-B in the sets of racks 540A-B through the coupled power routing assembly 510 to which each of the busways 530B-C is coupled via respective cables 518A-B and tap boxes 520A-B.

In some embodiments, the power support redundancy provided to electrical loads via busways in a busway system can be interchangeably provided, where the power support redundancy can be changed based at least in part upon changing the couplings between one or more of the busways and an upstream component. In the illustrated embodiment, for example, where busways 530B-C are coupled to power routing assembly 510 to provide N+1 power support redundancy to rack computer systems 540A-B, the coupling of one of the tap boxes 520 and cables 518 to one or more of the busways 530 can be changed to change the power support redundancy provided to the rack computer systems 540A-B. For example, as shown, tap box 520A can be decoupled from busway 530C and recoupled to busway 530A, as illustrated by tap box 520C, so that power cable 518A carries power from busway 530A to power inlet 512A of the power routing assembly 510, via tap box 520C. As a result, where busways 530A-B are primary power busways, the busway system 530 can be changed from providing N+1 power support redundancy to the rack computer systems 540A-B to providing 2N power support redundancy. In some embodiments, certain tap boxes and cables coupled to given busways can be decoupled from power inlets 512A-B, and other tap boxes and cables coupled to other busways can be coupled to the power inlets 512A-B, to change the power support redundancy provided to the power routing assembly 510.

Figure 6:
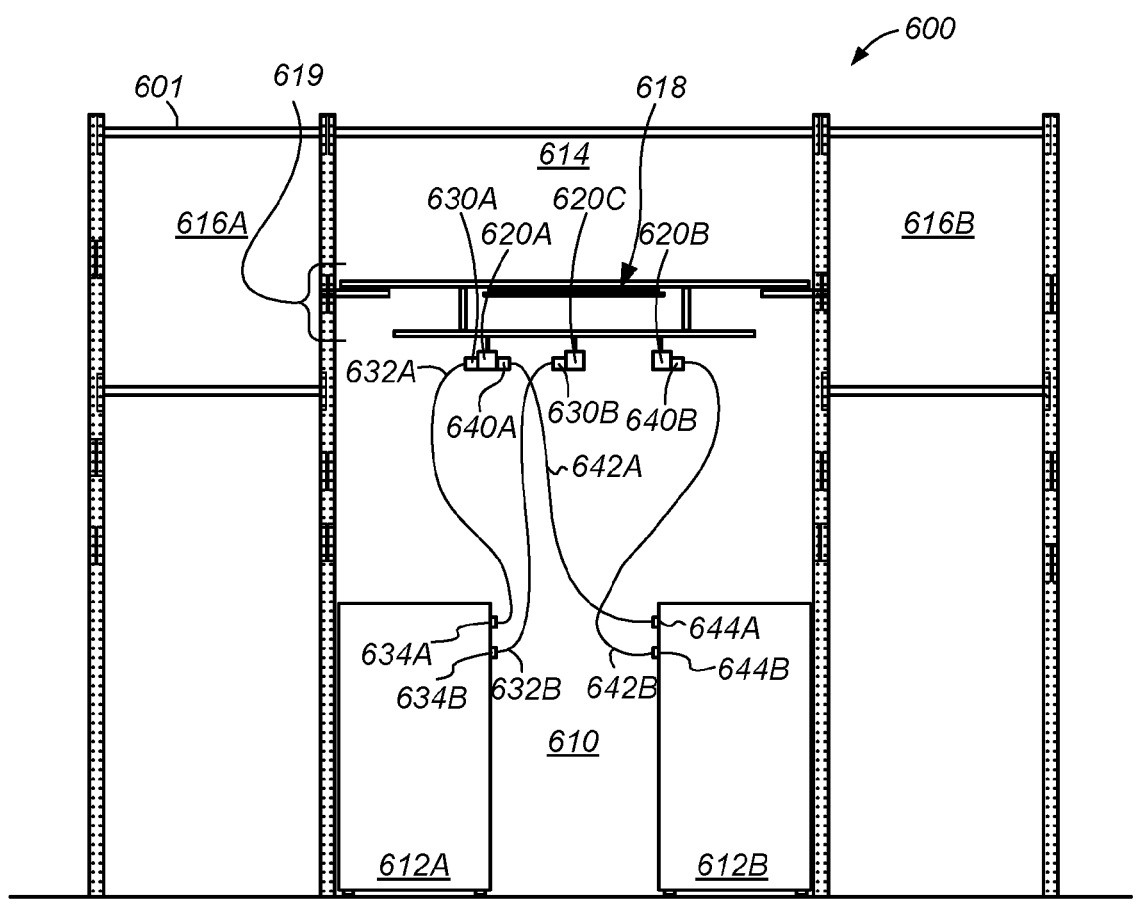
FIG. 6 is a schematic illustrating a front view of a computing room in which a busway system is installed, where power routing assemblies coupled to various power bus bars of a multi-phase power bus array to provide various power support redundancies according to some embodiments.

FIG. 6 is a schematic illustrating a front view of a computing room in which a busway system is installed, where power routing assemblies coupled to various power bus bars of a multi-phase power bus array to provide various power support redundancies according to some embodiments.

In some embodiments, a busway system can be installed to extend in various locations in a computer room. For example, a busway system of busways can extend beneath a raised floor, through a "hot aisle" into which exhaust air from rack computer systems is discharged, etc. In some embodiments, a busway system of busways is installed to extend, in an elevated position, through a "cold" aisle space of a computer room. A cold aisle space includes an aisle space, extending parallel to a row of rack computer systems, in which air that is provided to the rack computer systems as cooling air is circulated. Installing the busways in the cold aisle space can enable operator access to the busways with minimal risk to operator safety and minimal hindrance to access to the various rack computer systems, ATS cabinets, etc. installed in the computer room.

In the illustrated embodiment, data center 600 includes a computer room 601 in which a busway system of busways 620A-C is installed in an elevated position of a cold aisle space 610 of the computer room 601. Computer room 601 includes racks 612A-B installed in the aisle 610, where the racks include computer systems (not shown) that receive cooling air from the aisle 610 and discharge exhaust air into one or more exhaust plenums 616A-B, which can include one or more hot aisle spaces. Cooling air can be provided to aisle 610 via one or more vents 618 from one or more cooling air plenums 614 which can be installed above the aisle as illustrated, beneath the aisle in a raised floor plenum, etc.

In the illustrated embodiment, busways 620A-C are installed to hang in an elevated position in the cold aisle space 610 from a ceiling structure 619 which includes vent 618, and each busway couples to one or more various electrical loads installed in the cold aisle space 610 via one or more tap boxes and power cables. For example, busway 620A is coupled to a power inlet 634A of rack 612A via tap box 630A and power cable 632A and is also coupled to a power inlet 644A of rack 612B via tap box 640A and power cable 642A. As a result, busway 620A provides power support to electrical loads supported by either of racks 612A-B. In some embodiments, where one or more of racks 612A-B includes an upstream component, which can include an ATS cabinet that distributes power to one or more external electrical loads installed in the aisle space 610, busway 620A can provide power support to the electrical loads through coupling with the upstream components 612A-B.

In some embodiments, various power support redundancies can be provided to various loads in the computer room based at least in part upon which busways are electrically coupled to the loads. The power support redundancies can be changed based at least in part upon changing the couplings between the various busways and loads and can be implemented while maintaining power distribution through the busways. In some embodiments, where the busways are coupled to upstream components that distribute power to various loads in the computer room via branch circuits, the power support redundancy provided to the loads can be changed while maintaining the configuration of the branch circuits between the upstream components and the downstream loads, where the power support redundancy is changed based at least in part upon changing the coupling between the various busways and the upstream components.

In the illustrated embodiment, for example, each of busways 620A-C can carry power from a separate power source, so that various combinations of power from various power sources can be provided to electrical loads in the aisle space 610 to provide various power support redundancies to the loads. As shown, while busway 620A is coupled to both racks 612A-B, busway 620B is coupled to inlet 644B of rack 612B, via tap box 640B and power cable 642B, while busway 620C is coupled to inlet 634B of rack 612A via tap box 630B and power cable 632B. As a result, rack 612A receives power support from the power sources feeding power to busways 620A and 620C, while rack 612B receives power support from the power sources feeding power to busways 620A and 620B.

In some embodiments, one or more of the busways carries power from various types of power sources, so that coupling different combinations of busways to a given electrical load results in different power support redundancies being provided to the electrical load. For example, where busways 620A, 620B each carry power from a separate primary power source, and busway 620C carries power from a secondary power source, electrically coupling busway 620C and either busways 620A or 620B to an electrical load provides N+1 power support redundancy to that electrical load, as shown in the illustrated embodiment with regard to busways 620A, C electrically coupled to rack 612A. In addition, electrically coupling busway 620A and 620B to an electrical load can provide 2N power support redundancy to that load, as shown in the illustrated embodiment with regard to busways 620A, B electrically coupled to rack 612B. In some embodiments, a load can be coupled to a single busway 620, one or more busways that carry power from a common power source, etc., so that an N power support redundancy is provided to the load.

In some embodiments, a busway system of busways that is installed to extend through an aisle space in an elevated position enables rapid coupling of one or more busways to electrical loads to provide interchangeable power support redundancy. Such an installation of busways can enable the power support redundancies to be changed rapidly while maintaining power distribution through the busways, while maintaining couplings between upstream components and downstream electrical loads, etc. For example, in the illustrated embodiment, busways 620A-C extend above the racks 612A-B in computer room 601 and do not obstruct the floor space in either the cold aisle space 610 or the plenums 614, 616. In addition, couplings between the various busways 620A-C and racks 612A-B are visible to operators in the aisle space 610, enabling rapid visual determination of the present power support redundancy provided to various racks 612A-B in the aisle space 610.

In some embodiments, the open presence of the power cables 632A-B, 642A-B, and tap boxes 630A-B, 640A-B in the aisle space 610 between the various busways 620A-C and racks 612A-B enables the power cables and tap boxes to be coupled and decoupled between various busways and electrical loads while maintaining configurations of other equipment in the computer room 601. In the illustrated embodiment, for example, a rack 612A that is installed in cold aisle space 610 can be coupled to one or more busways 620A-C via extending one or more power cables from one or more power inlets 634A-B of the rack 612A to one or more various busways 620A-C, where a tap box, which can include a receptacle tap box, disconnect box, etc. couples the power cables to the respective busways to electrically couple the busways to the rack. In some embodiments, the power cables and tap boxes remain coupled to respective busways 620A-C, and an end of a power cable distal from its respective tap box can be coupled with a power inlet of a rack to electrically couple a busway with the rack. Uninstalling a rack from the aisle space can include decoupling the electrical coupling between the rack and the various busways via the power cables.

In some embodiments, an aisle space 610 includes various positions in which various electrical loads can be installed. The loads can include upstream components, including ATS cabinets, and downstream components, including rack computer systems. In some embodiments, the busway system of busways 620 enables upstream and downstream components to be interchangeably electrically coupled with one or more busways 620A-C, in any of the available positions in the aisle space 610. As the busways 620A-C and racks 612A-B are coupled via one or more power cables and tap boxes, a busway 620 can be coupled with a power inlet of a load 612 mounted in a given position in the aisle space 610 regardless of whether the load is a downstream component, upstream component, etc. In some embodiments, a given position in the aisle space 610 can be switched between receiving a downstream component and an upstream component, and the one or more busways 620 can be coupled and decoupled from whichever upstream or downstream components are installed in the given position to provide power support redundancy to at least the components. In some embodiments, different combinations of power cables and tap boxes are used to couple busways and loads based at least in part upon which components comprise the loads. For example, a busway 620 can be coupled to an upstream component via a disconnect box which is coupled to the busway and a power cable that coupled the disconnect box with a power inlet of the upstream component. In another example, a busway 620 can be coupled to a downstream component via a receptacle tap box and power cable.

Furthermore, the open presence of the power cables 632, 642 and tap boxes 630, 640 in the aisle space 610 between the various busways 620A-C and racks 612A-B enables the power cables 632A-Bm 642A-B and tap boxes 630A-B, 640A-B to be easily accessed and switched between various couplings of busways and loads while maintaining the configurations of the racks 612A-B and busways 620A-C themselves. For example, tap box 640A can be decoupled from busway 620A and re-coupled to busway 620C, thereby changing rack 612B from receiving power support from busway 620A to receiving power support from busway 620C. Where busway 620A carries power from a primary power source and busway 620C carries power from a secondary power source, the above decoupling and recoupling of tap box 640A can change rack 612B from receiving 2N power support redundancy from busways 620A, B to receiving N+1 power support redundancy from busways 620B, C. Where rack 612B includes an upstream component, including an ATS cabinet, switching the power support redundancy provided to the ATS cabinet can include changing the power support redundancy provided to downstream electrical loads supported by the ATS cabinet, while maintaining branch circuits electrically coupling the ATS cabinet to the downstream electrical loads.

Figure 7:
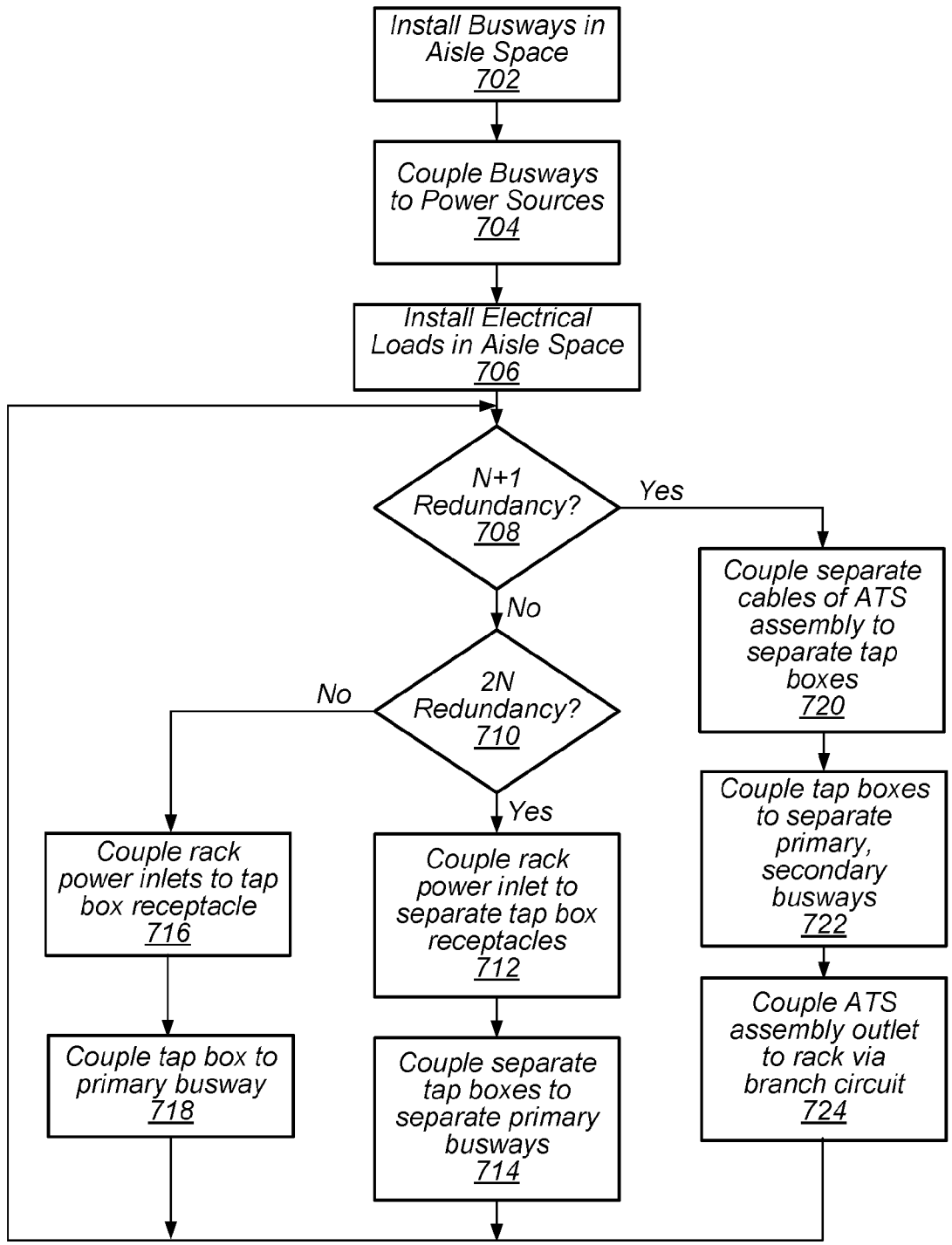
FIG. 7 illustrates configuring a busway system to provide various power support redundancies to electrical loads in an aisle space according to some embodiments.

FIG. 7 illustrates configuring a busway system to provide various power support redundancies to electrical loads in an aisle space according to some embodiments.

At 702, one or more busways are installed in an aisle space of a computer room. The busways can include one or more primary power busways. In some embodiments, the one or more busways include one or more secondary power busways. At least some of the busways may have a length that is less than the full length of the aisle space, and busways may be installed in various regions of the aisle, so that at least some busways extend through certain regions of the aisle space exclusively of one or more other busways. Such busways may be referred to as being in a "staggered" configuration. Some busways installed in an aisle space may be installed in a staggered configuration and some may not be installed in a staggered configuration. For example, primary power busways installed in an aisle space may be in a staggered configuration, and secondary power busways may not, so that while some primary power busways may extend through certain respective regions of the aisle space through which other primary power busways do not extend, the secondary power busways may extend through each of the respective regions of the aisle space.

In some embodiments, one or more of the busways are installed to extend through a cold aisle space of a computer room. The busways can be installed to extend in an elevated position, so that the busways are suspended above potential loads that may be installed in the aisle space.

At 704, the various busways installed in the aisle space are electrically coupled to one or more power sources. The primary power busways, in some embodiments, are each electrically coupled to separate primary power sources. Where multiple secondary power busways are installed in the aisle space, some of the secondary power busways can be electrically coupled to a common secondary power source. Each of the busways can be electrically coupled to a power source via a power transmission line extending into the aisle space and coupling at one or more ends of a respective busway. Where one or more busways are installed in a staggered configuration, one or more power transmission lines may extend from one end of the aisle space and through one or more regions of the aisle space to couple with an end of busways that do not extend through the region proximate to the end of the aisle space from which the power transmission lines extend.

At 706, one or more electrical loads are installed in one or more positions in the aisle space. Electrical loads may include one or more rack computer systems, ATS cabinets, PDUs, etc. The aisle space can include delineated cabinet positions in which an electrical load can be mounted. In some embodiments, a rack computer system, ATS cabinet, etc. can be mounted in any of the available cabinet positions in the aisle space. The particular cabinet position in which a load is selected to be mounted may be determined based at least in part upon various characteristics of the load, including power requirement, and various characteristics of the busways in the various regions of the aisle space, including available current. In some embodiments, upstream components such as ATS cabinets and rack computer systems can be interchangeably mounted in various cabinet positions in the aisle space. Where ATS cabinets and rack computer systems are mounted in the aisle space, branch circuits can be installed that electrically couple the ATS cabinets to one or more of the rack computer systems, so that the ATS cabinet can distribute power to the rack computer systems.

At 708-724, the various loads installed in the aisle space are electrically coupled with various installed busways to configure the various busways to provide one or more various power support redundancies to the various loads in the aisle space. Which busways are electrically coupled to a load can establish which power support redundancies are provided to the load.

At 708, a determination is made whether a power support redundancy to be provided to one or more electrical loads is a redundancy that includes secondary power, which can include an N+1 redundancy. If not, as shown at 710-714, the electrical load may be provided with a multiple of N redundancies, which can include one or more of N redundancy, 2N redundancy, 3N redundancy, etc., collectively referred to as @N redundancy. At 710, 712, and 714, if 2N redundancy is to be provided, then the busway system can be configured to provide 2N redundancy to an electrical load. At 712, separate power inlets of the electrical load are coupled to separate tap boxes via separate power cables. The tap boxes can include receptacle tap boxes, disconnect boxes, some combination thereof, or the like. Where the load includes an ATS cabinet that distributes power to rack computer systems via branch circuits, the coupling can include coupling separate power inlets of the ATS cabinet with separate receptacle tap boxes via separate power cables. The ATS cabinet can include one or more switching device assemblies that can selectively route power from one of the primary power busways to various rack computer systems via one or more branch circuits. Where the electrical load is a rack computer system, the coupling can include coupling separate power inlets of the rack computer system with separate receptacle tap boxes via separate power cables. At 714, the separate tap boxes are coupled to separate primary power busways in the aisle space, thereby electrically coupling the separate primary power busways with the electrical load via the separate power cables and tap boxes. The tap boxes can be coupled to the busway. In some embodiments, the tap boxes are removably coupled to the busways and can be decoupled from some busways and recoupled to other busways as desired.

At 716-718, where 2N power redundancy is not to be provided, N redundancy can be provided. At 718, the electrical load can be coupled to one or more tap boxes via one or more power cables. At 716, the one or more tap boxes can be coupled to one or more busways carrying power from a common primary power source to electrically couple the one or more primary power busways with the electrical load.

At 720-724, where power support redundancy is to include power support from a secondary power source, at least one secondary power busway is configured, with at least one primary power busway, to provide at least N+1 power support redundancy to one or more electrical loads. At 720, each of at least two power inlets of the electrical load are coupled to the separate tap boxes via separate power cables. In some embodiments, an electrical load receiving N+1 power support redundancy is an upstream component, which can include an ATS cabinet, which distributes power from one or more sources to various rack computer systems via branch circuits. At 722, the separate tap boxes are separately coupled to the secondary power busway and at least one primary power busway. At 724, for example, where the electrical load includes an ATS cabinet, the ATS cabinet is coupled to various rack computer systems via respective branch circuits, thereby electrically coupling the rack computer systems to receive N+1 power support redundancy from the secondary and primary busways via the ATS cabinet.

In some embodiments, and as illustrated in FIG. 7, the power support redundancy provided to one or more electrical loads in an aisle space can be changed from the initial provided redundancy to another different redundancy. The busway system enables redundancies to be changed rapidly without affecting energization of busways, branch circuits, etc. For example, where an electrical load includes an ATS cabinet that is coupled to primary and secondary power busways to receive N+1 power redundancy, the busways can be reconfigured to provide 2N redundancy to the ATS cabinet by decoupling the power cable feeding secondary power from the secondary power busway and recoupling the power cable to a primary power busway. Such decoupling and recoupling can include decoupling a tap box, disconnect box, etc., that is coupled to the power cable, from one busway and recoupling the box to another busway, thereby changing the busway to which the power cable is coupled. In another example, where multiple power cables are each coupled to separate power busways, the ATS cabinet can be decoupled, at the ATS cabinet power inlet, from one power cable that is coupled to a secondary power busway and coupled to another separate power cable that is coupled to a primary power busway. Such changing of power support redundancy may be performed without altering the branch circuits that distribute power from the ATS cabinet to the rack computer systems.

In some embodiments, the size of the power cables is restricted to enable coupling between a load and busways to the busways that are extending through the aisle space within a certain proximity distance of the electrical load. Where at least some of the busways are installed in the aisle space in a staggered configuration, restricting the size of the power cables can restrict certain busways from coupling with the electrical load, thereby enabling load balancing across the various staggered busways based at least in part upon the location of the load.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A data center, comprising:
a plurality of rack computer systems in aisles;
a physical arrangement of power busways in one or more of the aisles, the physical arrangement of the power busways comprising:
at least two primary power busways that extend in a staggered configuration through a portion of an aisle space of an aisle of the one or more aisles, and
at least one secondary power busway that extends through the portion of the aisle space;
wherein the staggered configuration of the at least two primary power busways physically restricts coupling of one or more of the plurality of rack computer systems in the aisle to one or more busways in the aisle.

2. The data center of claim 1, wherein each of the at least two primary power busways and the at least one secondary power busway extend at least partially through an elevated portion of the aisle space.

3. The data center of claim 1, wherein:
to extend in a staggered configuration, each of the at least two primary power busways extend at least partially through a common region of the aisle space; and
the at least two primary power busways are configured to electrically couple, via separate power cables, to another proximate rack computer system located in the common region to provide power support redundancy to the other proximate rack computer system.

4. The data center of claim 1, wherein the at least one secondary power busway and a particular one of the primary power busways that extend through the portion of the aisle space are configured to electrically couple, via separate power cables, to a proximate rack computer system located in the portion of the aisle space to provide a power support redundancy to the proximate rack computer system.

5. The data center of claim 4, further comprising a switching assembly for routing power;
wherein to electrically couple, via separate power cables, to the proximate rack computer system, the secondary power busway and particular primary power busway are configured to couple with a switching device assembly, via the separate power cables, where the switching assembly selectively routes power from one of the secondary power busway and particular primary power busway to the proximate rack computer system via a branch circuit.

6. The data center of claim 5, wherein the secondary power busway and primary power busways are configured to change the power support redundancy provided to the proximate rack computer system, wherein, to change the power support redundancy provided to the proximate rack computer system, the particular primary power busway is decoupled from the switch device assembly via a particular power cable, and another primary power busway is coupled to the switch device assembly via the particular power cable while maintaining distribution of power to one or more of the rack computer systems via at least one other of the power cables and the branch circuit.

7. The data center of claim 1, wherein:
each of the at least two primary power busways is configured to provide exclusive primary power support to electrical loads located in a respective region through which the respective primary power busway extends independently of other primary power busways; and
the at least one secondary power busway is configured to provide secondary power support to electrical loads that are located in separate respective regions of the aisle space and receive primary power support from separate primary power busways extending exclusively through the separate respective regions.

8. A system, comprising:
a plurality of power busways configured to extend through one or more regions of an aisle space, each region spanning a full width and a separate limited portion of a length of the aisle space; and
a plurality of power cables configured to electrically couple the power busways to electrical loads located in the aisle space, wherein a length of the power cables restricts each of the electrical loads from being coupled to a busway that does not extend through a respective region of the aisle space.

9. The system of claim 8, wherein:
the plurality of power busways are configured to extend in a staggered configuration through the aisle space, and
at least one of the plurality of power busways that are configured to extend in a staggered configuration is configured to:
extend less than a full length of the aisle space and
extend through a particular region of the aisle space that is free of at least one other of the plurality of power busways.

10. The system of claim 9, wherein:
to extend in a staggered configuration, the plurality of power busways are configured to extend at least partially through a common region of the aisle space,
the plurality of power busways are configured to interchangeably provide at least one of a plurality of power support redundancies to at least one electrical load located in the aisle space, and
to interchangeably provide at least one of a plurality of power support redundancies to at least one electrical load located in the aisle space, the plurality of power busways are configured to provide power support redundancy to an electrical load in the common region of the aisle space.

11. The system of claim 10, wherein:
the common region of the aisle space extends through a central region of the aisle space; and
each of the plurality of power busways extend at least partially, and independent of each other, through separate particular regions of the aisle space extending away from the central region of the aisle space towards opposite ends of the aisle space.

12. The system of claim 11, wherein:
at least one of the plurality of power busways comprises a secondary power busway configured to distribute power from at least one secondary power source;
each of the remaining power busways that is not the secondary power busway is configured to provide exclusive power support to electrical loads located in a respective region through which the respective power busway extends independently of other power busways; and
the secondary power busway is configured to provide secondary power support to electrical loads that are located in separate respective regions of the aisle space and receive power support from separate power busways extending exclusively through the separate respective regions.

13. The system of claim 10, wherein, to interchangeably provide power support redundancy to an electrical load in the common region of the aisle space, the plurality of power busways are configured to:
electrically couple with a particular rack computer system, via respective tap boxes coupled to each of the plurality of power busways; and
electrically decouple from the particular rack computer system, via the respective tap boxes.

14. The system of claim 10, comprising separate tap boxes;
wherein to interchangeably provide at least one of a plurality of power support redundancies to at least one electrical load located in the aisle space, each of the plurality of power busways are configured to electrically couple with one or more electrical loads via separate power cables that are each coupled to a separate ones of the separate tap boxes and each have a limited length corresponding to a size of the particular region of the aisle space through which the power busway extends independently of at least one other of the plurality of power busways, such that the electrical loads located in the particular region are restricted from electrically coupling with at least the other power busway.

15. A method, comprising:
configuring an aisle to provide one or more of a plurality of power support redundancies to one or more of a plurality of electrical loads, wherein configuring comprises:
enforcing, across busways of an aisle, load balancing of electrical loads of an aisle space comprising a plurality of electrical loads, enforcing comprising:
installing at least two primary power busways to extend through one or more regions of the aisle, each region spanning a full width and a separate limited portion of a length of an aisle space of the aisle; and
electrically coupling the two primary busways to the electrical loads of the aisle via power cables, wherein a length of the power cables precludes the electrical loads from being coupled to a busway of the two primary busways that does not extend through the region of the aisle space in which the respective electrical loads are located.

16. The method of claim 15, wherein said installing the at least two primary power busways to extend through one or more regions of the aisle comprises installing the at least two primary power busways to extend in a staggered configuration through the length of the aisle space, wherein at least one of the at least two primary power busways extending in a staggered configuration extends less than an entirety of the length of the aisle space and extends through a particular region of the aisle space that is free of at least one other of the at least two primary power busways.

17. The method of claim 16, wherein:
installing the at least two primary power busways to extend in a staggered configuration through the length of the aisle space comprises installing the at least two primary power busways to extend at least partially through a common region of the aisle space; and
electrically coupling the two primary busways to the electrical loads via the power cables comprises electrically coupling the two primary power busways, via separate power cables, to an electrical load located in the common region of the aisle space to provide primary power support redundancy to the electrical load.

18. The method of claim 16, further comprising:
installing at least one secondary power busway to extend through an entirety of the length of the aisle space, said installing including installing the at least one secondary power busway to distribute power from a secondary power source to an electrical load, located in one region of the aisle space, that receives primary power from a particular one of the at least two primary power busways and to further distribute power from the secondary power source to another electrical load, located in another region of the aisle space, that receives primary power from another one of the at least two primary power busways.

19. The method of claim 18, wherein:
the at least one secondary power busway is electrically coupled to a plurality of separate secondary power sources, via separate power inputs to the secondary power busway, such that the secondary power busway is configured to selectively distribute power received from at least one of the plurality of separate secondary power sources.

20. The method of claim 15, wherein the configuring comprises:
changing the power support redundancy provided to the electrical loads while maintaining power distribution through the at least two power busways, wherein changing the power support redundancy comprises:
decoupling a power cable from electrically coupling the one or more of the at least two power busways to the electrical loads; and
recoupling the power cable to electrically couple another one or more of the at least two power busways to the electrical loads;
wherein the power support redundancy provided to the electrical loads by the one or more of the at least two power busways is different from the power support redundancy provided by the other one or more of the at least two power busways.

\* \* \* \* \*